United States Patent
Liu et al.

(10) Patent No.: US 10,179,328 B2
(45) Date of Patent: Jan. 15, 2019

(54) LOW TEMPERATURE SCR CATALYST FOR DENITRATING DIESEL VEHICLE EXHAUST, AND PREPARATION METHOD THEREOF

(71) Applicant: Sichuan Zhongzi Exhaust Purge Co., Ltd., Chengdu (CN)

(72) Inventors: Zhikun Liu, Chengdu (CN); Yun Li, Chengdu (CN); Tao Lin, Chengdu (CN); Yaoqiang Chen, Chengdu (CN)

(73) Assignee: Sichuan Zhongzi Exhaust Purge Co., Ltd., Chengdu (CN)

( * ) Notice: Subject to any disclaimer, the term of this patent is extended or adjusted under 35 U.S.C. 154(b) by 412 days.

(21) Appl. No.: 14/771,797

(22) PCT Filed: Apr. 11, 2013

(86) PCT No.: PCT/CN2013/074063
§ 371 (c)(1),
(2) Date: Aug. 31, 2015

(87) PCT Pub. No.: WO2014/134855
PCT Pub. Date: Sep. 12, 2014

(65) Prior Publication Data
US 2016/0023195 A1    Jan. 28, 2016

(30) Foreign Application Priority Data
Mar. 5, 2013 (CN) .......................... 2013 1 0068345

(51) Int. Cl.
*B01J 29/06*        (2006.01)
*B01J 29/14*        (2006.01)
*B01J 29/04*        (2006.01)
*B01J 29/072*       (2006.01)
*B01J 35/04*        (2006.01)
*B01J 37/00*        (2006.01)
*B01J 37/02*        (2006.01)
*B01J 29/46*        (2006.01)
*B01D 53/94*        (2006.01)
(Continued)

(52) U.S. Cl.
CPC ........ *B01J 29/146* (2013.01); *B01D 53/9418* (2013.01); *B01J 29/044* (2013.01); *B01J 29/072* (2013.01); *B01J 29/106* (2013.01); *B01J 29/46* (2013.01); *B01J 29/7615* (2013.01); *B01J 35/04* (2013.01); *B01J 37/0009* (2013.01); *B01J 37/0201* (2013.01); *B01J 37/0213* (2013.01); *B01J 37/0215* (2013.01); *B01J 37/0236* (2013.01); *B01J 37/08* (2013.01); *B01D 2255/20738* (2013.01); *B01D 2255/20761* (2013.01); *B01D 2255/50* (2013.01); *B01D 2255/502* (2013.01); *B01D 2255/504* (2013.01); *B01J 2229/186* (2013.01); *Y02A 50/2325* (2018.01); *Y02T 10/24* (2013.01)

(58) Field of Classification Search
CPC ........ B01J 29/044; B01J 29/072; B01J 29/46; B01J 29/146; B01J 29/7615; B01J 2229/186; B01J 35/04; B01J 37/0009; B01J 37/0201; B01J 37/0205; B01J 37/0213; B01J 37/0215; B01J 37/0236; B01J 37/08; B01D 53/9418; B01D 2255/50; B01D 2255/502; B01D 2255/504
USPC ........................... 502/64, 66, 69, 71, 77, 79
See application file for complete search history.

(56) References Cited

U.S. PATENT DOCUMENTS 5,516,497 A * 5/1996 Speronello ......... B01D 53/9418
                                                      423/235
8,987,162 B2 * 3/2015 Narula ............... B01D 53/9418
                                                      423/700
(Continued)

FOREIGN PATENT DOCUMENTS

CN    101450322 A    6/2009
WO    2012025617 A1  3/2012

OTHER PUBLICATIONS

PCT International Search Report with English translation dated Dec. 19, 2013; International Application No. PCT/CN2013/074063; Mar. 5, 2013; 6 pages; International Searching Authority/CN; State Intellectual Property Office of the P.R. China; Beijing, China.

(Continued)

*Primary Examiner* — Elizabeth D Wood
(74) *Attorney, Agent, or Firm* — Andrew D. Fortney; Central California IP Group, P.C.

(57) ABSTRACT

Provided are a low-temperature SCR catalyst for denitrating diesel vehicle exhaust, and preparation method thereof. The catalyst uses a molecular sieve as a carrier, and uses metallic elements such as copper and iron as active components. The catalyst preparation method comprises: preprocessing the molecular sieve; conducting multiple equal-volume impreparations; after impreparation, drying to dehydrate, and calcining; and finally pulping and coating to prepare the catalyst. The catalyst employs base metals such as copper and iron instead of precious metals as active components, thus reducing costs, being harmless to humans, and being environmentally friendly. The preparation method of the catalyst is simple and feasible with low requirements for raw materials, employs a repeated but small-quantity method of equal volume impregnation; and enables active ions to be dispersed more uniformly as compared with the existing conventional preparation methods, thus improving utilization and improving low-temperature catalytic activity and durability.

19 Claims, 2 Drawing Sheets

(51) Int. Cl.
  *B01J 29/10*   (2006.01)
  *B01J 29/76*   (2006.01)
  *B01J 37/08*   (2006.01)

(56) References Cited

U.S. PATENT DOCUMENTS

| | | | |
|---|---|---|---|
| 2007/0199302 A1* | 8/2007 | Yavuz | B01D 53/864 |
| | | | 60/274 |
| 2012/0039759 A1 | 2/2012 | Narula et al. | |
| 2012/0093702 A1* | 4/2012 | Andersen | B01D 53/8628 |
| | | | 423/210 |
| 2013/0236382 A1 | 9/2013 | Reddy et al. | |

OTHER PUBLICATIONS

Can Li et al.; "Preparation Method Fe/ZSM-5 Catalyst for Directly Decomposing N2O"; Bibliographic Data of CN101450322 (A); Jun. 10, 2009; http://worldwide.espacenet.com.

* cited by examiner

LOW TEMPERATURE SCR CATALYST FOR DENITRATING DIESEL VEHICLE EXHAUST, AND PREPARATION METHOD THEREOF

RELATED APPLICATION(S)

The present application claims priority to Chinese Pat. Appl. No. 201310068345.6, filed in the State Intellectual Property Office of the People's Republic of China on Mar. 5, 2013.

TECHNICAL FIELD OF THE INVENTION

The invention relates to the field of the preparation technology of a catalyst, in particular to the field of the preparation technology of a molecular sieve type SCR catalyst, particularly a molecular sieve type SCR catalyst for purifying diesel vehicle exhaust for the low-temperature conversion of $NO_X$ gas, and the preparation thereof.

TECHNICAL BACKGROUND OF THE INVENTION

A diesel, with its characteristics of low fuel consumption and high power ratio, is more and more widely applied. However, as nitrogen oxides of $NO_X$ generated in a cylinder of a diesel engine under high temperature and high pressure has brought serious environmental problems and exacerbates the deterioration of air quality, China has improved the emission standards for road vehicles with the diesel engine, currently, in terms of purifying diesel vehicle exhaust of $NO_X$, Selective Catalytic Reduction (SCR) technology is mainstream technology, a urea-SCR system is most widely used, its principle is that a certain percentage of urea solution is injected at the front end of an SCR catalytic converter, ammonia produced by urea hydrolysis or pyrolysis is taken as a reductant to selectively reduce $NO_X$ at catalyst surface, however, the development of its core component of the SCR catalytic converter has a great shortage, i.e., when a vehicle is idling or under under-speed conditions, the exhaust temperature is mostly below 200° C., in such case, the conventional vanadium-titanium-tungsten type SCR has the temperature window of 280° C.-400° C., which cannot meet the requirement of $NO_X$ purification at low temperature. Meanwhile, long-term and heavy use of precious metals, particularly the use of vanadium, not only causes high production cost and environmental pollution, but also has a very serious damage to the human body.

Therefore, the development of SCR catalyst, which is more adaptive to low temperature and high conversion rate and is environmentally friendly, is the direction which the catalyst industry has been trying to explore.

SUMMARY OF THE INVENTION

The present invention discloses a low-temperature SCR catalyst for denitrating diesel vehicle exhaust, and a preparation method thereof according to inadequacies in existing technologies. The first problem to be solved by the present invention is to provide a catalyst composition which does not adopt precious metal and/or vanadium but adopts copper and iron as compound active components and which is harmless to human body; the second problem to be solved by the present invention is to provide a new method for preparing a compound active component zeolite SCR catalyst, which not only meets the requirements of low temperature and high conversion but also has good durability and sulfur resistance.

A low-temperature SCR catalyst for denitrating diesel vehicle exhaust of the present invention is realized by the following technical solution:

The SCR catalyst uses a molecular sieve as a carrier, and uses metallic elements such as copper and iron as active components.

The copper accounts for 2-4% of the total mass of the molecular sieve according to $Cu^{2+}$, iron accounts for 3-5% of the total mass of the molecular sieve according to $Fe^{3+}$.

Preferably, copper accounts for 3% of the total mass of the molecular sieve according to $Cu^{2+}$, iron accounts for 4% of the total mass of the molecular sieve according to $Fe^{3+}$.

The above carrier is selected from the molecular sieve with a dendrimer-like pore structure. For example, it is selected from a ZSM-5 type molecular sieve or a Y type molecular sieve.

A preparation method for a low-temperature SCR catalyst of the invention includes the following steps:

Step ①: preprocessing the molecular sieve: weighing accurately the molecular sieve; placing it in an oven, ventilating and heating the oven for four hours under the temperature of 90° C., and decreasing the temperature to be room temperature;

Step ②: conducting equal-volume impreparation for the first time: detecting the specific pore volume of the material dried in Step ①, adding the molecular sieve powder in Step ① into a reaction kettle, calculating soluble molysite solid and soluble nantokite solid according to $Cu^{2+}$ and $Fe^{3+}$ respectively: $Cu^{2+}$ accounts for 1-2% of the total mass of the molecular sieve, and $Fe^{3+}$ accounts for 1.5-2.5% of the total mass of the molecular sieve, both of $Cu^{2+}$ and $Fe^{3+}$ are calculated according to their total amount: preparing Cu and Fe into aqueous solution according to the proportion of 2.5-4.5% of the total mass of the molecular sieve, the total volume of the solution=the mass of the molecular sieve*specific pore volume, slowly adding the solution in the form of mist spray, stirring it constantly and continuously stirring the solution for one hour after the completion of the spray; then stirring the solution under the temperature of 60° C. for one hour, heating it to be the temperature of 80° C. and continuing to stir it into fine powder;

Step ③: drying to dehydrate: taking out the powder in Step ②, encasing it in a stainless steel disc, calcining it in a ventilated oven under the temperature of 120° C. for two hours, removing water absorbed in surface and passing it through a 40-mesh screen;

Step ④: conducting equal-volume impreparation for the second time: adding the obtained molecular sieve in Step ③ into the reaction kettle, and repeating the impreparation steps of Step ② and Step ③;

Step ⑤: calcining: calcining the powder obtained in Step ④ under the temperature of 550° C. for two hours, naturally cooling it down to be under the room temperature and obtaining dark red powder;

Step ⑥: pulping and coating: adding the powder obtained in Step ⑤ with an adhesive, and preparing it into serous fluid which is coated on a carrier, dried and calcined to prepare the catalyst.

The active component of the invention uses an equal-volume impregnation method, the equal-volume impregnation can be carried out once, twice or several times, preferably twice and so on. Experiments show that multiple equal-volume impregnations can facilitate the ingredients of metal copper catalyst and metal iron catalyst to be distributed more uniformly and have better activity and more stable performances.

The soluble molysite solid and the soluble nantokite solid in the present application are preferably their respective nitrates.

The present invention employs zeolitic molecular sieve as raw material, the active ingredients, through a variety of load means, enter into the zeolite framework, after drying, calcination and so on, special catalyst coating is prepared, the catalyst coating is coated on ceramic or metal substrate to form monolithic catalyst, the special active ingredients can significantly reduce the ignition temperature of $NO_X$ to be 150° C., and has a certain durability, which has practical significance on the denitration of the exhaust of diesel vehicles under low-temperature operation conditions of cities.

The raw material of the present invention is the molecular sieve with a dendrimer-like pore structure which is selected from a ZSM-5 type molecular sieve or a Y type molecular sieve. The active ingredient is loaded into the pores of zeolitic material, and then dried and calcined to be dispersed uniformly into the surface pores of the carrier. Therefore, the catalyst coating has higher stability and higher selectivity.

Many performances of the coating material, including XRD, B.E.T. method, the particle size, surface acidity, $NH_3$ adsorption, etc., are detected, the coating material is proved to have big specific surface area and pore size, as well as excellent surface acidity and $NH_3$ adsorption/desorption under service temperature, which meets $NO_X$ catalytic reduction requirements.

The evaluation of catalytic activity of the coating material proves that the coating has good catalytic activity. After hydrothermal aging and sulfur resistance test, the catalyst remains high activity at low temperatures, which better meets the diesel vehicle market requirements of China urban conditions.

The invention does not adopt precious metal and/or metal vanadium but adopts copper and iron base metals as compound active components, thus reducing costs, being harmless to humans, and being environmentally friendly. The preparation method of the catalyst of the present invention is simple and feasible with low requirements for raw materials, employs a repeated but small-quantity method of equal-volume impregnation, and enables active ions to be dispersed more uniformly as compared with the existing conventional preparation methods, thus improving utilization and improving low-temperature catalytic activity and durability.

EMBODIMENTS OF THE INVENTION

Figure 1:
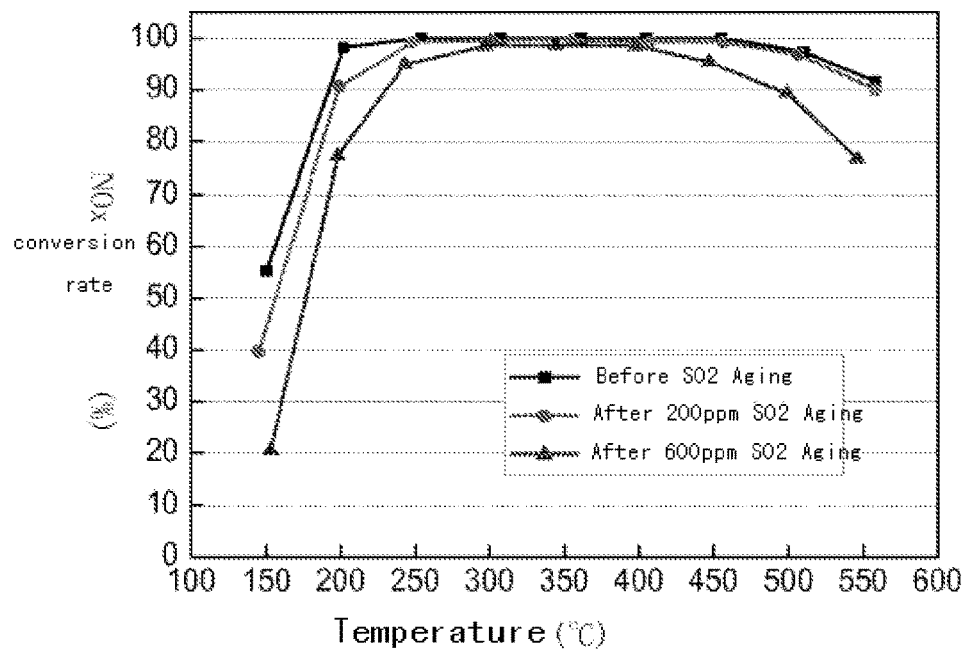
FIG. 1 is conversion performance curves of $NO_X$ of SCR catalyst at high sulfur environment of the present invention.

The invention is further described based on the following examples, the examples are only used for further describing the invention but do not limit the protection scope of the invention, the person skilled in the art can carry out non-essential improvements and adjustments according to the above contents, without departing from the protection scope of the invention.

Embodiment 1

The Preparation for a Low-Temperature SCR Catalyst

Step ①: preprocessing the molecular sieve: weighing accurately a molecular sieve; placing it in an oven, ventilating and heating the oven for four hours under the temperature of 90° C., removing water adsorbed on the surface and other impurities, and decreasing the temperature to be room temperature. Embodiment 1 adopts a BEA-type molecular sieve or a Y-type molecular sieve.

Step ②: conducting equal-volume impreparation for the first time: detecting the specific pore volume of the material dried in Step ①, adding the molecular sieve powder in Step ① into a reaction kettle, calculating soluble molysite solid and soluble nantokite solid according to $Cu^{2+}$ and $Fe^{3+}$ respectively: $Cu^{2+}$ accounts for 1-2% of the total mass of the molecular sieve, and $Fe^{3+}$ accounts for 1.5-2.5% of the total mass of the molecular sieve, both of $Cu^{2+}$ and $Fe^{3+}$ are calculated according to their total amount: preparing $Cu^{2+}$ and $Fe^{3+}$ into aqueous solution according to the proportion of 2.5-4.5% of the total mass of the molecular sieve, the total volume of the solution=the mass of the molecular sieve*specific pore volume, slowly adding the solution in the form of mist spray, stirring the solution constantly and continuing to stir the solution for one hour after the completion of the addition of the solution; then stirring the solution under the temperature of 60° C. for one hour, heating it to be the temperature of 80° C. and continuing to stirring it into fine powder;

Step ③: drying to dehydrate: taking out the powder in Step ②, encasing it in a stainless steel disc, calcining it in a ventilated oven under the temperature of 120° C. for two hours, removing water absorbed in surface and passing it through a 40-mesh screen;

Step ④: conducting equal-volume impreparation for the second time: adding the obtained molecular sieve in Step ③ into the reaction kettle, and repeating the impreparation steps of Step ② and Step ③;

Step ⑤: calcining: calcining the powder obtained in Step ④ under the temperature of 550° C. for two hours, naturally cooling it down to the room temperature and obtaining dark red powder;

Step ⑥: pulping and coating: powder material is prepared into pulp with solid content of 40%-42%. The pulp is coated on cordierite ceramic carrier, placed into an electric oven blast, then put in a box-type resistance furnace after drying, and calcined by the order from room temperature to 300° C. (1 hr)^550° C. to obtain the low-temperature SCR catalyst.

Embodiment 2

The Preparation of a Low-Temperature SCR Catalyst by the Mass Ratio of $Cu^{2+}$ and $Fe^{3+}$ of 2:5

Weighing accurately a molecular sieve of 200 g; placing it in an oven, ventilating and heating the oven for four hours under the temperature of 90° C., removing water adsorbed on the surface and other impurities, and decreasing the temperature to be room temperature. Detecting its specific pore volume, and placing it into a reaction kettle. Placing copper nitrate [$Cu(NO_3)_2 \cdot 3H_2O$] of 7.56 g and iron nitrate [$Fe(NO_3)_3 \cdot 9H_2O$] of 36.07 g in water of 103.85 ml, and stirring an obtained solution until they are dissolved. Slowly adding the solution in the molecular sieve, stirring the solution constantly and continuing to stir the solution for one hour after the completion of the addition of the solution. Taking out the powder, encasing in a stainless steel disc, calcining in a ventilated oven under the temperature of 120° C. for two hours, removing water absorbed in a surface and passing the powder through a 40-mesh screen. Adding the obtained powder into the reaction kettle, adding equal-amount solution again, spraying mist into the solution and drying the solution. calcining the obtained powder under the temperature of 550° C. for two hours and obtaining dark red powder; adding an adhesive into the dark red powder, and preparing it into serous fluid which is coated on cordierite ceramic honeycomb carrier with the screen number of 400 cell/in$^2$ and the volume of 38.4 ml, and drying and calcining the carrier to obtain a low-temperature SCR catalyst.

Embodiment 3

The Preparation of a Low-Temperature SCR Catalyst by the Mass Ratio of $Cu^{2+}$ and $Fe^{3+}$ of 3:4

Weighing accurately a molecular sieve of 200 g; placing it in an oven, ventilating and heating the oven four hours under the temperature of 90° C., removing water adsorbed on the surface and other impurities, and decreasing the temperature to be room temperature. Detecting its specific pore volume, and placing it into a reaction kettle. Placing copper nitrate [$Cu(NO_3)_2 \cdot 3H_2O$] of 11.34 g and iron nitrate [$Fe(NO_3)_3 \cdot 9H_2O$] of 28.86 g in water of 105.89 ml, and stirring an obtained solution until they are dissolved. Other operation is the same as that of Embodiment 2.

Embodiment 4

The Preparation of a Low-Temperature SCR Catalyst by the Mass Ratio of $Cu^{2+}$ and $Fe^{3+}$ of 4:3

Weighing accurately a molecular sieve of 200 g; placing it in an oven, ventilating and heating the oven four hours under the temperature of 90° C., removing water adsorbed on the surface and other impurities, and decreasing the temperature to be room temperature. Detecting its specific pore volume, and placing it into a reaction kettle. Placing copper nitrate [$Cu(NO_3)_2 \cdot 3H_2O$] of 15.13 g and iron nitrate [$Fe(NO_3)_3 \cdot 9H_2O$] of 21.64 g in water of 107.93 ml, and stirring an obtained solution until they are dissolved. Other operation is the same as that of Embodiment 2.

Comparative Example 1

A conventional V—Ti—W-type SCR catalyst sold on the market is dissected, and the catalyst, of which the specification of the carrier is the same as that of Embodiment 1, is selected.

Detection Results

The activity evaluation test of catalysts from the above embodiments and Comparative Example 1 is carried out. The test conditions are as follows:

The volume composition of gases: nitric oxide: 500 ppm, ammonia: 500 ppm, carbon dioxide: 5°%, vapour: 4.5%, oxygen: 14%, nitrogen: balance gas; airspeed: ˆ○○○ hˆ.

The evaluation results of activity are in the following Table 1.

| | $NO_X$ | |
|---|---|---|
| | $T_{50}$/° C. | $T_{90}$/° C. |
| Embodiment 2 | 165 | 210-568 |
| Embodiment 3 | 157 | 196-565 |
| Embodiment 4 | 150 | 192-530 |
| Comparative Example 1 | 214 | 255-452 |

The above table 1 shows the followings:

The three kinds of catalysts have sound conversion temperature of $NO_X$ meeting the purification requirement for the current diesel vehicle exhaust.

Comparing with Comparative Example, Embodiment 2, Embodiment 3 and Embodiment 4 all have lower ignition temperature and a larger conversion temperature window. Comparing with the conventional V—Ti—W type SCR catalyst, the description of the low temperature SCR catalyst of the invention has better catalytic performance.

Comparing with Example 2 and Example 4, Example 3 has lower ignition temperature of $NO_X$ and the maximum conversion temperature window, showing that the catalytic performance of the catalyst of Example 3 has the most catalytic performance.

Embodiment 5

The Performance Detection Experiment for Catalyst

Related detection experiments are carried out for the catalyst prepared according to Embodiment 3. The results of sulfur resistance test, different airspeed tests, hydrothermal aging test and bench test show that the catalyst prepared according to this invention has excellent low-temperature ignition activity for $NO_X$ and the stability under the conditions of high sulfur, high airspeed and high temperatures.

FIG. 1 is conversion performance curves of $NO_X$ of SCR catalyst at high sulfur environment of the present invention. FIG. 1 shows that the performance of the present catalyst is not substantially decreased after the aging under the conditions of 200 ppm $SO_2$, 200° C. 29 hr (equivalent to the conditions that a vehicle runs 25,000 km with the fuel with sulfur content of 670 ppm). The catalyst still has very effective performance after the aging under the conditions of 600 ppm $SO_2$, 200° C. 29 hr (equivalent to the conditions that a vehicle runs 25,000 km with the fuel with sulfur content of 2000 ppm). However, the sulfur content of the fuel of the present diesel vehicle is 350 ppm, therefore, the present catalyst has better sulfur resistance. The results are shown in the following table 2.

| | $NO_X$ | |
|---|---|---|
| | $T_{50}$/° C. | $T_{90}$/° C. |
| Fresh | 157 | 196-565 |
| After the aging under the conditions of 200 ppm $SO_2$, 200° C. 29 hr | 158 | 198-558 |
| After the aging under the conditions of 600 ppm $SO_2$, 200° C. 29 hr | 176 | 230-492 |

Figure 2:
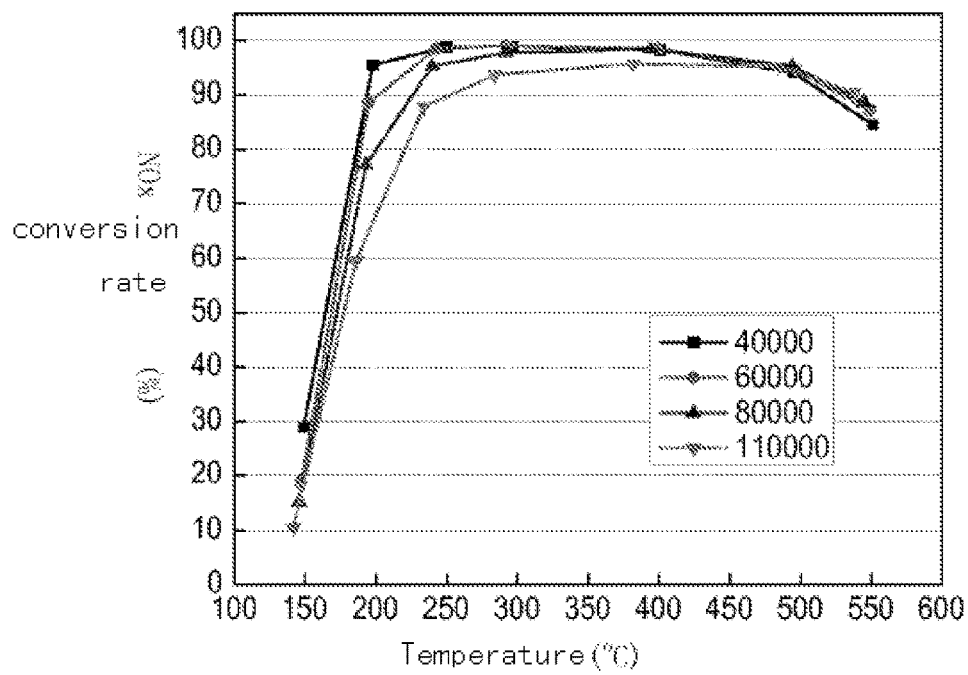
FIG. 2 is conversion performance curves of $NO_X$ of SCR catalyst at different airspeeds of the invention.

FIG. 2 is conversion performance curves of $NO_X$ of SCR catalyst at different airspeeds of the invention. FIG. 2 shows that the conversion performance of $NO_X$ of the present catalyst is slightly decreased with the increase of airspeed but the decrease is not obvious, the present catalyst still has very effective performance under the conditions of 110,000 $h^{-1}$ airspeed. Therefore, the present catalyst has very sound airspeed performance. The results are shown in Table 3.

|  | NO$_X$ | |
| --- | --- | --- |
|  | $T_{50}$/° C. | $T_{90}$/° C. |
| 40000 h$^{-1}$ | 165 | 194-519 |
| 60000 h$^{-1}$ | 168 | 202-529 |
| 80000 h$^{-1}$ | 172 | 226-534 |
| 110000 h$^{-1}$ | 177 | 253-542 |

Figure 3:
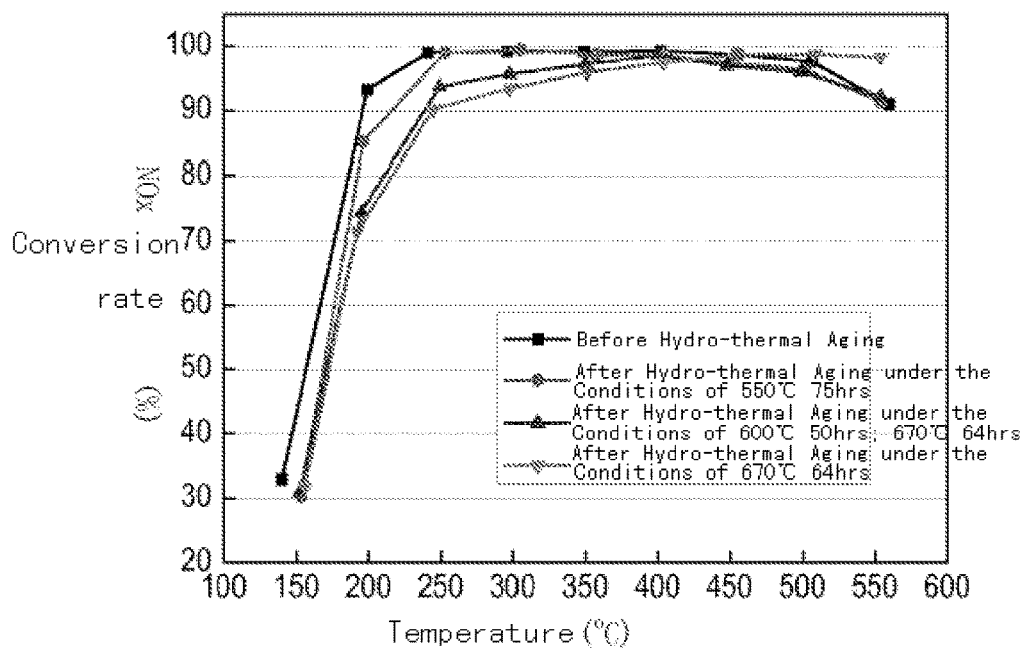
FIG. 3 is conversion performance curves of $NO_X$ of SCR catalyst at different hydrothermal aging conditions of the invention.

FIG. 3 is conversion performance curves of NO$_X$ of an SCR catalyst at different hydrothermal aging conditions of the invention. The table shows that the performance of the present catalyst is not obviously decreased after its aging under the conditions of 550° C. 75 hr and 600° C. 50 hr of the conventional V—Ti—W type SCR catalyst; the present catalyst still has very effective performance after the aging under the worse high-temperature conditions of 670° C. 64 hr. Therefore, the present catalyst has very sound anti-hydrothermal aging performance. The results are shown in Table 4.

|  | NO$_X$ | |
| --- | --- | --- |
|  | $T_{50}$/° C. | $T_{90}$/° C. |
| Fresh | 157 | 196-565 |
| After the aging under the conditions of 550° C. 75 hrs | 168 | 216-563 |
| After the aging under the conditions of 600° C. 50 hrs | 171 | 239-574 |
| After the aging under the conditions of 670° C. 64 hrs | 172 | 244->555 |

Figure 4:
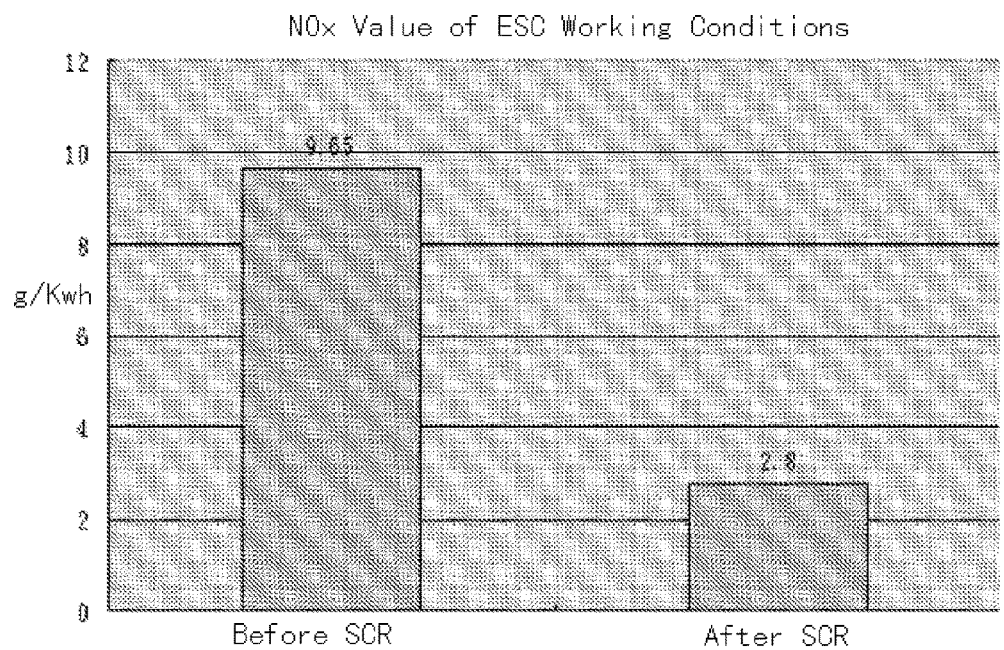
FIG. 4 is emission value (g/kwh) of $NO_X$ of an SCR catalytic converter before and after a steady-state engine bench test of the invention.

FIG. 4 is emission value (g/kwh) of NO$_X$ of an SCR catalyst before and after a steady-state engine bench test of the invention. FIG. 4 shows that the average emission value of NO$_X$ is 2.8 g/kwh, which reaches the national IV standard after an SCR catalytic converter of the present invention is installed. (Engine Model: WP7, 4.2 L, national IV standard of 3.5 g/kwh. A bench test is carried out according to the procedures prescribed in national IV standard.).

The above results show that: comparing with the conventional V—Ti—W type SCR catalyst, the catalyst of the invention has better catalytic performance.

What is claimed is:

1. A preparation method for a low-temperature selective catalytic reduction (SCR) catalyst for denitrating diesel vehicle exhaust, wherein the method comprises:
    preprocessing a ZSM-5, BEA or Y type molecular sieve by placing it in a ventilated oven, and heating the molecular sieve to 90° C. in the oven for 4 hours;
    conducting a first equal-volume impregnation by detecting a specific pore volume of the preprocessed molecular sieve, adding the preprocessed molecular sieve into a reaction kettle, preparing an aqueous solution of $Cu^{2+}$ and $Fe^{3+}$ to provide $Cu^{2+}$ in an amount that is 1-2% of the total mass of the molecular sieve and $Fe^{3+}$ in an amount that is 1.5-2.5% of the total mass of the molecular sieve, wherein a total amount of both $Cu^{2+}$ and $Fe^{3+}$ is in a proportion of 2.5-4.5% of a total mass of the molecular sieve, and a total volume of the aqueous solution=a mass of the molecular sieve*the specific pore volume, adding the solution in the form of mist spray, stirring the aqueous solution and the preprocessed molecular sieve together; then stirring and heating the aqueous solution and the preprocessed molecular sieve at a temperature of up to 80° C. until a fine powder is formed;
    drying to dehydrate the fine powder by calcining the fine powder in a ventilated oven at a temperature of 120° C., and passing the dried fine powder through a screen;
    repeating the first equal-volume impregnation;
    calcining the dried fine powder at a temperature of 550° C. and cooling it to room temperature to obtain a dark red powder;
    adding an adhesive to the dark red powder, coating a carrier with a fluid comprising the adhesive and the dark red powder, and heating, drying and calcining the fluid-coated carrier to prepare the catalyst.

2. A preparation method according to claim 1, wherein the soluble aqueous solution of $Cu^{2+}$ and $Fe^{3+}$ comprises copper nitrate and iron nitrate.

3. A preparation method according to claim 1, wherein the molecular sieve is heated at a temperature of 90° C. during preprocessing.

4. A preparation method according to claim 3, wherein the molecular sieve is heated in the oven for four hours during preprocessing, and preprocessing further comprises decreasing the temperature to room temperature after heating.

5. A preparation method according to claim 1, wherein, in the first equal-volume impregnation $Cu^{2+}$ accounts for 1-2% of the total mass of the molecular sieve and $Fe^{3+}$ accounts for 1.5-2.5% of the total mass of the molecular sieve.

6. A preparation method according to claim 1, wherein the first equal-volume impregnation comprises adding the aqueous solution in the form of mist spray to the preprocessed molecular sieve, prior to stirring the aqueous solution and the preprocessed molecular sieve.

7. A preparation method according to claim 6, wherein the aqueous solution and the preprocessed molecular sieve are stirred at a temperature of 60-80° C. for at least one hour.

8. A preparation method according to claim 1, wherein drying the fine powder comprises heating the fine powder in the ventilated oven at a temperature of 120° C. for two hours.

9. A preparation method according to claim 1, wherein the screen comprises a 40-mesh screen.

10. A preparation method according to claim 1, wherein the fluid-coated carrier is dried and calcined at a temperature of 550° C. for two hours.

11. A preparation method according to claim 1, wherein the fluid-coated carrier is heated at a temperature of up to 550° C. to prepare the catalyst.

12. A preparation method according to claim 1, wherein the fluid-coated carrier is calcined at 300° C. for 1 hour, then at 550° C., to prepare the catalyst.

13. A preparation method according to claim 1, wherein the $Cu^{2+}$ is present in an amount of 2-4% of the total mass of the molecular sieve in the catalyst, and the $Fe^{3+}$ is present in an amount of 3-5% of the total mass of the molecular sieve in the catalyst.

14. A preparation method according to claim 13, wherein the $Cu^{2+}$ is present as 3% of the total mass of the molecular sieve in the catalyst, and the $Fe^{3+}$ is present as 4% of the total mass of the molecular sieve in the catalyst.

15. A preparation method according to claim 1, e carrier comprises a ceramic or metal.

16. A preparation method according to claim 15, wherein the carrier has a honeycomb structure.

17. A preparation according to claim 15, wherein the carrier comprises cordierite.

18. A preparation method according to claim 1, wherein drying to dehydrate the fine powder comprises calcining the fine powder in the ventilated oven at 120° C. for two hours.

19. A preparation method according to claim 1, wherein calcining the dried fine powder comprises heating the dried fine powder at 550° C. for two hours and cooling it to room temperature to obtain the dark red powder.

* * * * *

UNITED STATES PATENT AND TRADEMARK OFFICE
CERTIFICATE OF CORRECTION

PATENT NO. : 10,179,328 B2
APPLICATION NO. : 14/771797
DATED : January 15, 2019
INVENTOR(S) : Zhikun Liu et al.

Page 1 of 1

It is certified that error appears in the above-identified patent and that said Letters Patent is hereby corrected as shown below:

On the Title Page

Item (73) The Assignee: change "Sichuan Zhongzi Exhaust Purge Co., Ltd." to "Sinocat Environmental Technology Co., Ltd."

Signed and Sealed this
Third Day of March, 2020

Andrei Iancu
*Director of the United States Patent and Trademark Office*